(12) United States Patent
Corbett

(10) Patent No.: US 6,367,069 B1
(45) Date of Patent: Apr. 2, 2002

(54) EFFICIENT ARRAY DESCRIPTORS FOR VARIABLE-SIZED, DYNAMICALLY ALLOCATED ARRAYS

(75) Inventor: Robert P. Corbett, Berkeley, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/241,796

(22) Filed: Feb. 1, 1999

(51) Int. Cl.[7] .................................................. G06F 9/45
(52) U.S. Cl. ........................ 717/8; 717/3; 717/4; 717/7
(58) Field of Search ................. 717/8, 3, 4, 7

(56) References Cited

U.S. PATENT DOCUMENTS

| | | | |
|---|---|---|---|
| 5,274,818 A | * 12/1993 | Vasilevsky et al. | 717/5 |
| 5,475,842 A | * 12/1995 | Gilbert et al. | 717/6 |
| 5,659,753 A | * 8/1997 | Murphy et al. | 717/5 |
| 5,805,915 A | * 9/1998 | Wilkinson et al. | 712/20 |
| 5,862,385 A | * 1/1999 | Iitsuka | 717/9 |
| 6,128,639 A | * 10/2000 | Pase | 708/654 |

OTHER PUBLICATIONS

Paek et al., "Simplification of Array Access Patterns for Compiler Optimizations", ACM, pp. 60–71, Jun. 1998.*
Shen et al., "An Empirical Study of Fortran Programs for Parallelizing Compilers", IEEE, pp. 356–364, Jul. 1990.*
Hemlet et al., "Exploring Dataflow Testing of Arrays", IEEE, pp. 118–129, May 1993.*

* cited by examiner

Primary Examiner—Tuan Q. Dam
Assistant Examiner—Ted T. Vo
(74) Attorney, Agent, or Firm—Park, Vaughan & Fleming LLP

(57) ABSTRACT

One embodiment of the present invention provides a computer readable memory including an array descriptor data structure which contains information on an organization of an array of data values in order to facilitate accesses into the array of data values. This array descriptor data structure includes a starting address of the array in the memory, and a group of extents, including an extent value for each dimension of the array, the extent value for a given dimension quantifying a number of elements in the given dimension. This array descriptor additionally includes a group of strides, including a stride value for each dimension of the array, the stride value of a given dimension quantifying a distance in array elements between consecutive array locations in the given dimension. Also included in the array descriptor data structure is a group of lower bound addresses, including a lower bound address for each dimension of the array. According to one aspect of the present invention, the group of strides is located in consecutive memory locations, so that an access to an array element through subscripts retrieves strides from consecutive memory locations, thereby exhibiting good cache performance. According to another aspect of the present invention, the group of extents is located in consecutive memory locations, and the group of strides is located in consecutive memory locations, so that a whole array operation, which accesses all locations in the array, first retrieves extents from consecutive memory locations, and then retrieves strides from consecutive memory locations so as to exhibit good cache performance.

22 Claims, 4 Drawing Sheets

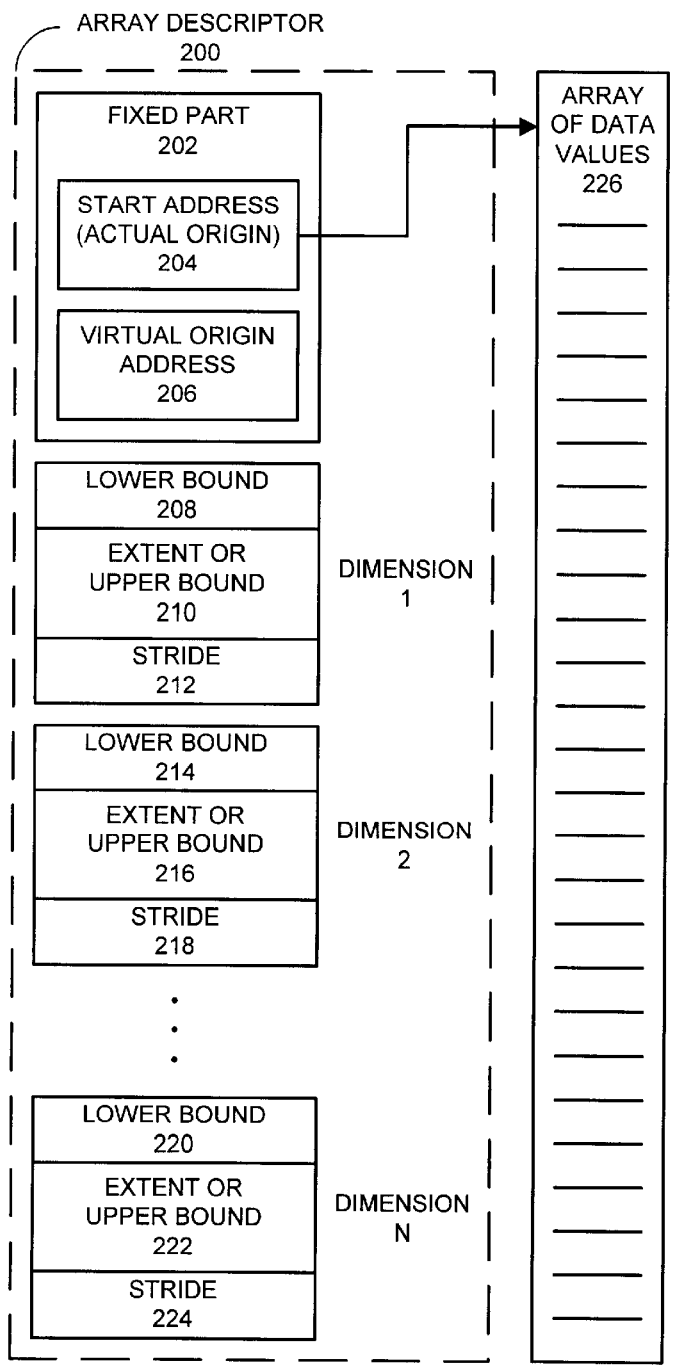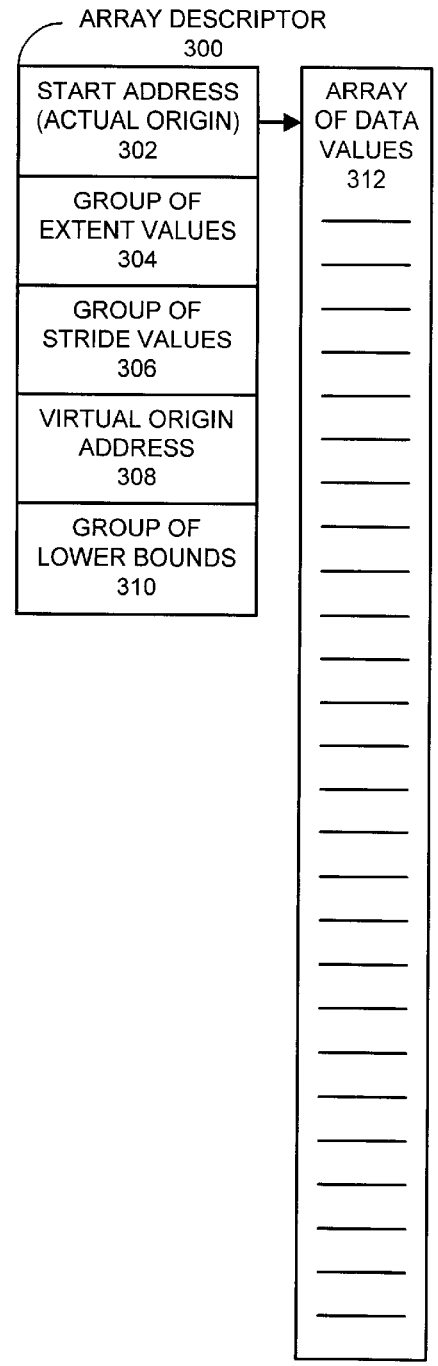
**FIG. 2
(PRIOR ART)**
FIG. 3

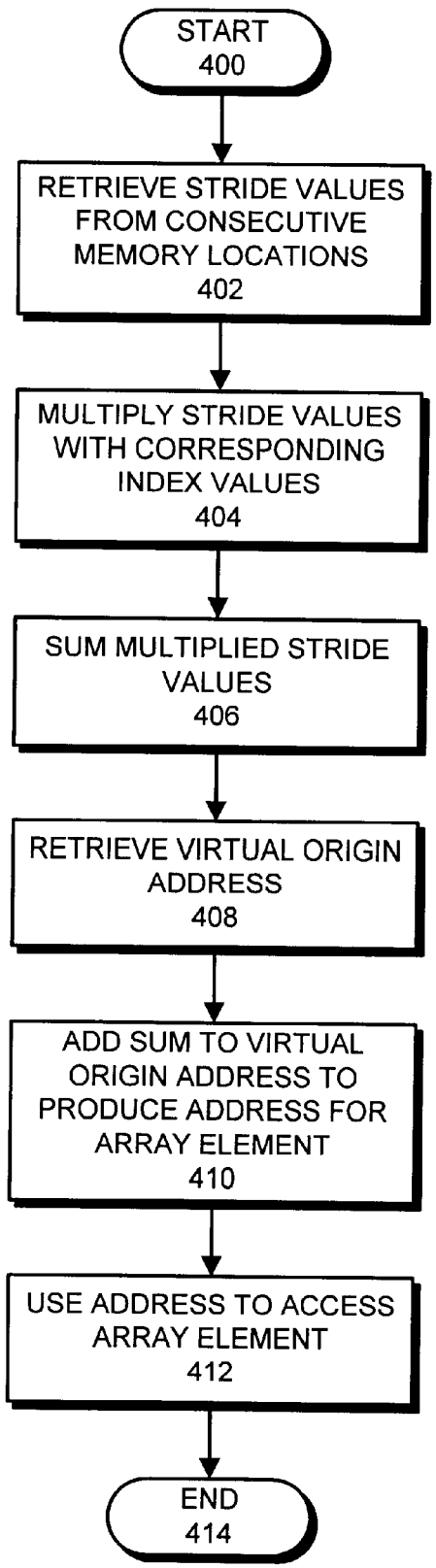
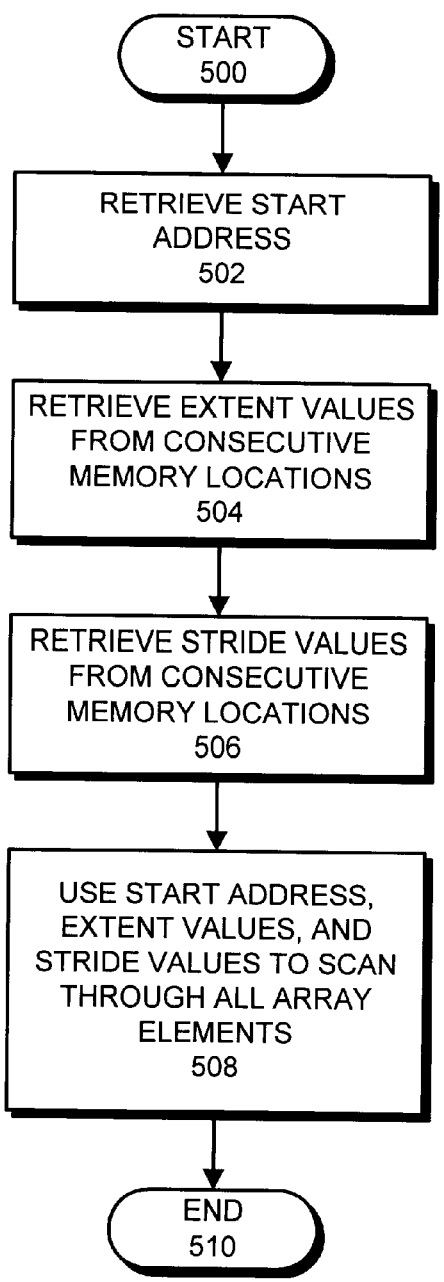
FIG. 4
FIG. 5

EFFICIENT ARRAY DESCRIPTORS FOR VARIABLE-SIZED, DYNAMICALLY ALLOCATED ARRAYS

Copyright Notice Pursuant to 37 C.F.R. § 1.71(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates to compilers and programming languages for computer systems. More particularly, the present invention relates to a method and apparatus for efficiently accessing variable-sized, dynamically allocated arrays.

Certain programming languages, such as the FORTRAN programming language, facilitate operations on variable-sized dynamically allocated arrays. In order to manipulate such arrays, these programming languages maintain certain information. This information includes static information, such as the type and rank of the array, which does not have to be tracked during run time. This information also includes dynamic information, such as the allocation status of the array, the locations of the array elements, and the array bounds in each dimension. These dynamic properties can change, and hence, must be tracked during program execution.

Most programming languages that support variable-sized dynamically allocated arrays, such as the FORTRAN programming language, maintain this information in a data structure known as an "array descriptor" (or informally, as a "dope vector").

Referring to FIG. 2, in an existing array descriptor data structure 200, the array descriptor data structure 200 comprises a fixed part 202 followed by a sequence of triplets, wherein the number of triplets equals the rank (number of dimensions) of the array. In the example illustrated in FIG. 2, the fixed part 202 includes a start address 204 (actual origin) of the array as well as a virtual origin address 206 of the array. The start address 204 points to the starting location of the array of data values 226. The virtual origin address 206 contains an address of a virtual array element, possibly outside the array, that has a zero index value for each dimension in the array.

Each triplet typically contains a lower bound value, an extent value (or upper bound) and a stride value. A given extent value quantifies a number of elements in a given dimension of the array. A given stride value quantifies a distance in array elements (or machine addressable units) between consecutive array locations in a given dimension. Note that the upper bound for a given dimension equals the lower bound for the given dimension added to the extent for the given dimension plus one. Hence, given a lower bound, the corresponding upper bound can be computed from the extent; likewise the extent can be computed from the upper bound.

Note that a triplet is associated with each dimension of the array. More specifically, dimension one has an associated triplet containing a lower bound 208, an extent or upper bound 210 and a stride 212. Dimension two has an associated triplet containing a lower bound 214, an extent or upper bound 216 and a stride 218. Dimension N has an associated triplet containing a lower bound 220, an extent or upper bound 222 and a stride 224.

One problem with the above-described layout of an array descriptor is that the information needed to perform common array access operations is interspersed with unnecessary information. In modem computer systems, this can lead to a large number of cache misses, which can significantly degrade system performance. This problem is particularly acute for microprocessors with small on-chip caches. This can create significant performance problems for common array access operations if accesses to array descriptors routinely cause cache misses.

SUMMARY

One embodiment of the present invention provides a computer readable memory including an array descriptor data structure which contains information on an organization of an array of data values in order to facilitate accesses into the array of data values. This array descriptor data structure includes a starting address of the array in the memory, and a group of extents, including an extent value for each dimension of the array, the extent value for a given dimension quantifying a number of elements in the given dimension. This array descriptor additionally includes a group of strides, including a stride value for each dimension of the array, the stride value of a given dimension quantifying a distance in array elements between consecutive array locations in the given dimension. Also included in the array descriptor data structure is a group of lower bound values, including a lower bound value for each dimension of the array. According to one aspect of the present invention, the group of strides is located in consecutive memory locations, so that an access to an array element through subscripts retrieves strides from consecutive memory locations, thereby exhibiting good cache performance. According to another aspect of the present invention, the group of extents is located in consecutive memory locations, and the group of strides is located in consecutive memory locations, so that a whole array operation, which accesses all locations in the array, first retrieves extents from consecutive memory locations, and then retrieves strides from consecutive memory locations so as to exhibit good cache performance.

BRIEF DESCRIPTION OF THE FIGURES

FIG. 2 illustrates an array descriptor data structure in accordance with the prior art.

FIG. 3 illustrates an array descriptor data structure in accordance with an embodiment of the present invention.

FIG. 4 is a flow chart illustrating the process of using indices and an array descriptor data structure to retrieve an array element in accordance with an embodiment of the present invention.

FIG. 5 is a flow chart illustrating the process of performing a whole array operation using an array descriptor data structure in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 6:
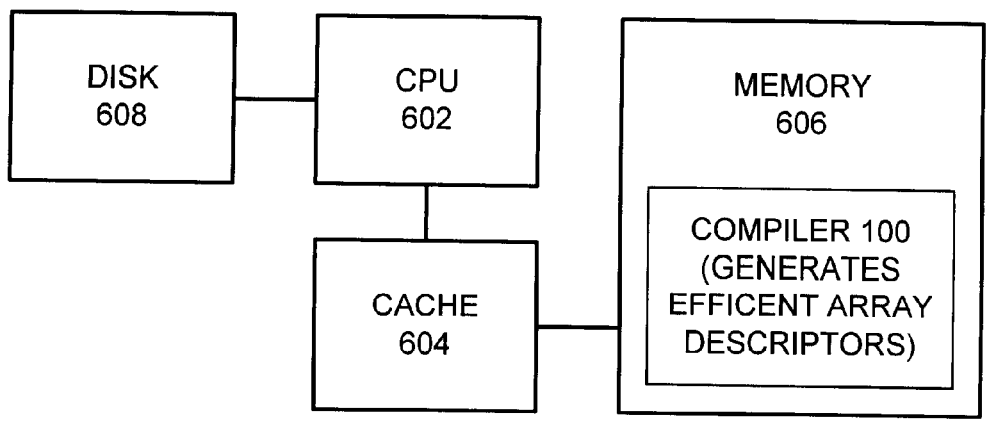
FIG. 6 illustrates a computer system upon which a compiler that generates efficient array descriptors operates in accordance with an embodiment of the present invention.

FIG. 6 illustrates a computer system upon which a compiler 100 that generates efficient array descriptors operates in accordance with an embodiment of the present invention. This computer system includes central processing unit (CPU) 602, cache 604, memory 606 and disk 608. CPU 602 may include any type of computing device that is capable of processing code and/or data. This includes, but is not limited to a CPU in a mainframe processor, a multi-processor system, a microprocessor, a device controller, and a computing unit within an appliance (such as a toaster). CPU 602 is coupled to cache 604, which stores code and/or data for use by CPU 602. Cache 604 is coupled to memory 606. Memory 606 may include any random access memory for storing code and/or data for execution by CPU 602. This includes, but is not limited to, random access memory, flash memory, magnetic storage devices and optical storage devices. Memory 606 contains code for compiler 100, which generates efficient array descriptors in accordance with an embodiment of the present invention. Compiler 100 is described in more detail below with reference to FIGS. 1–5. CPU 602 is coupled to disk 608. Disk 608 may include any device that resides in the I/O space of the computer system. This includes, but is not limited to data storage devices, such as a disk drive or a tape drive.

Compiler Structure

Figure 1:
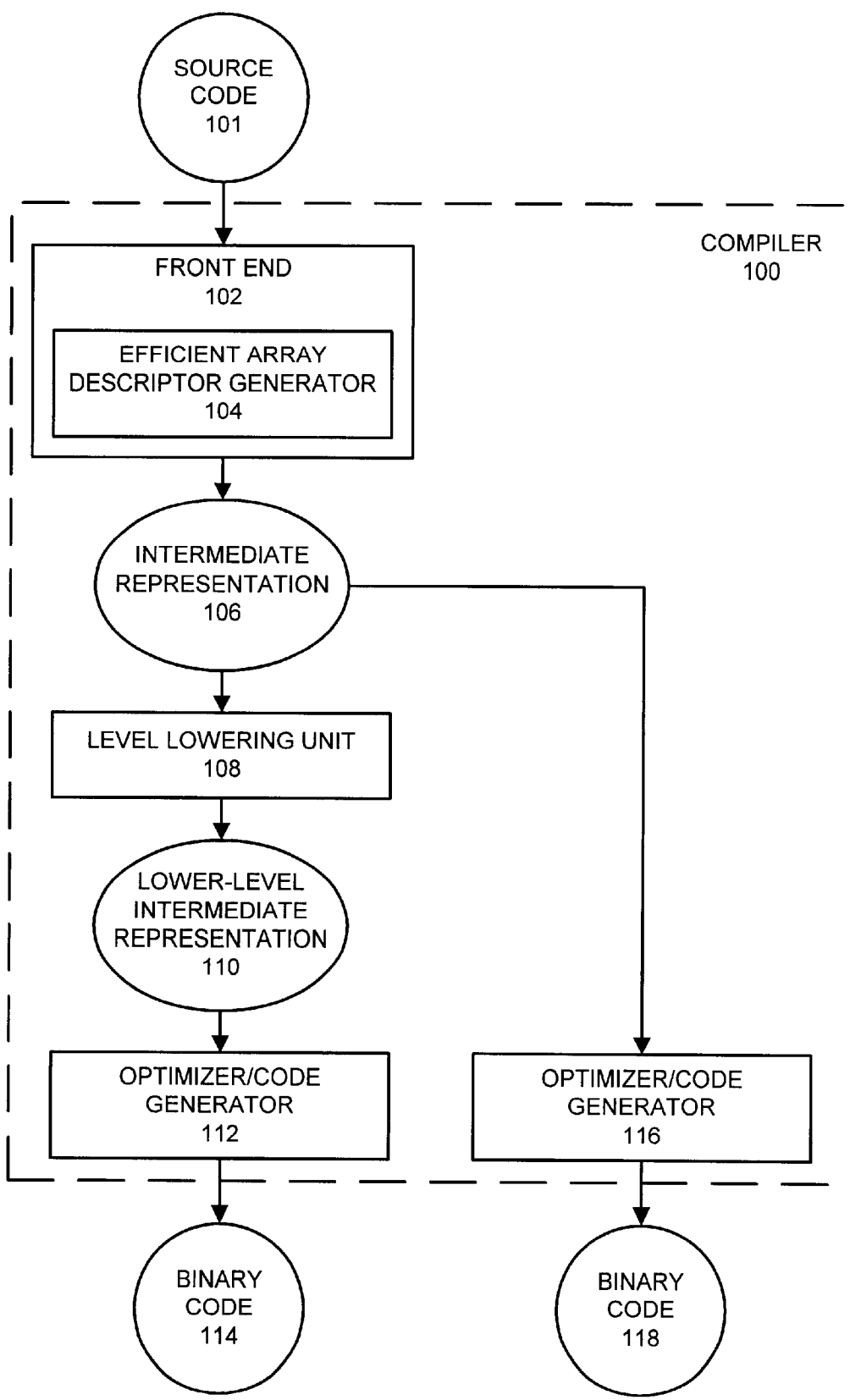
FIG. 1 illustrates part of the internal structure of a compiler in accordance with an embodiment of the present invention.

FIG. 1 illustrates part of the internal structure of a compiler 100 in accordance with an embodiment of the present invention. Compiler 100 includes front end 102, level lowering unit 108, optimizer/code generator 112 and optimizer/code generator 116. Front end 102 takes in source code 101 and generates intermediate representation 106. Front end 102 includes routines for describing run-time data structures to the backend of compiler 100. These routines include efficient array descriptor generator 104, which generates an efficient layout of an array descriptor data structure in accordance with an embodiment of the present invention. Note that source code 101 may include a computer program written in a high-level programming language, such as the FORTRAN programming language.

Level lowering unit receives intermediate representation 106 and outputs lower-level intermediate representation 110. In this embodiment, intermediate representation 106 is an architecture-independent representation of the program, whereas lower-level intermediate representation 110 is a representation of the program that is tailored for a particular hardware architecture.

Optimizer/code generator 112 takes as input lower-level intermediate representation 110 and outputs binary code 114. Optimizer/code generator 112 performs performance optimizations on lower-level intermediate representation 110 and generates binary code that ultimately executes on a particular processor. Note that binary code 114 includes executable machine instructions for a particular processor architecture.

Intermediate representation 106 additionally feeds through optimizer/code generator 116, which outputs binary code 118. Optimizer/code generator 116 generates binary code 118 for a second computer architecture that is different from the architecture for binary code 114.

Note that efficient array descriptor generator 104 is specially configured to organize an array descriptor data structure so that common array operations tend to reference consecutive locations within the array descriptor data structure, thereby exhibiting good cache performance.

Array Descriptor Structure

FIG. 2 illustrates an array descriptor data structure 200 in accordance with the prior art. As mentioned above, array descriptor data structure 200 includes a fixed part 202 as well as a triplet for each rank (dimension) of the array. These triplets typically contain a lower bound, an extent value and stride values for each dimension of the array. The main performance problem with this organization is that common array operations, such as accessing an array element through indices or performing whole array operations, tend to scan through all the stride values in sequence or all of the extent values in sequence. Such accesses skip over intervening elements in the present organization, and can hence cause a large number of cache faults. This can seriously degrade system performance during these common array operations.

FIG. 3 illustrates an array descriptor data structure in accordance with an embodiment of the present invention. In this embodiment, data items within array descriptor 300 are organized so as to achieve better cache performance. Instead of organizing data values into triplets as in FIG. 2, the data values are split up so that all of the extent values are located together, all the stride values are located together and all the lower bounds values are located together. More specifically, group of extent values 304 includes one extent value for each dimension of the associated array; group of stride values 306 includes one stride value for each dimension of the array; and group of lower bounds 310 includes one lower bound value for each dimension of the array.

For whole array operations the system uses start address 302, group of extent values 304 and group of stride values 306. Start address (actual origin) 302 is located adjacent to the group of extent values 304, which is adjacent to the group of stride values 306. This layout allows the system to linearly scan through start address 302, group of extent values 304 and group of stride values 306 without encountering any unnecessary data during a whole array operation. Hence, this layout improves cache performance on whole array operations.

For accesses that use indices (subscripts) the system uses group of stride values 306 and the virtual original address 308. In the layout illustrated in FIG. 3, group of stride values 306 is located adjacent to virtual origin address 308. During accesses that use indices, this layout allows the system to linearly scan through group of stride values 306 and virtual origin address 308 without encountering any unnecessary data. Hence, this layout improves cache performance during accesses that use indices.

One embodiment of the present invention does not include a virtual origin address 308 in array descriptor 300. In this embodiment, virtual origin address 308 is calculated from start address (actual origin) 302.

One embodiment of the present invention does not include group of extent values 304, but instead includes a corresponding group of upper bound values. Note that extent values can be computed from corresponding upper bound and lower bound values. Hence, no information is lost by storing upper bound values instead of extents.

The above-described layout of array descriptor 300 facilitates efficient accesses to elements within array of data values 312 as is described below with reference to FIGS. 4 and 5.

Process of Indexing an Array Element

FIG. 4 is a flow chart illustrating the process of using indices and an array descriptor data structure to retrieve an array element in accordance with an embodiment of the present invention. The system starts by retrieving stride values from consecutive memory locations in group of stride values 306 (from FIG. 3) (step 402). Next, the system multiplies these stride values with corresponding index values for each of the dimensions of the array (step 404). These multiplied stride values are added together to produce a sum (step 406). Next, the system retrieves virtual origin address 308 (step 408), and adds the sum of the multiplied stride values to virtual origin address 308 (step 410). Finally, the resulting address is used to access an element from array of data values 312 (step 412). This access may be either a read or a write operation.

For example, assume that virtual origin address=start address+22, and that the stride for dimension 1=11 and the stride for dimension 2=165. In order to access array element A(1,2), the system first retrieves stride values 11 and 165 (step 402), and multiplies them by corresponding indices 1 and 2, respectively (step 404), to produce the multiplied stride values. These multiplied stride values are summed to produce (1×11)+(2×165)=11+330=341. Next, the system retrieves the virtual origin address=start address+22 (step 408). The system then adds the virtual origin address to the sum of the multiplied stride values to produce the address of array element A(1,2)=start address+22+341=start address+ 363 (step 410). This address is then used to access array element A(1,2) (step 412).

Note that the present organization of array descriptor 300 ensures that the above-described accesses to group of stride values 306 and virtual origin address 308 come from consecutive memory locations in array descriptor 300. This results in good cache performance.

Also note in the above example, that the address of the array element may alternatively be computed by multiplying each stride value by a corresponding subscript minus a corresponding lower bound and then summing the multiplied values with the start address.

address=SUM(stride[i]*(i–lower bound[i]))+start address

This produces the same result because the virtual origin address=actual origin–SUM(stride[i]*lower bound[i]).

Process of Performing a Whole Array Operation

FIG. 5 is a flow chart illustrating the process of performing a whole array operation using an array descriptor data structure in accordance with an embodiment of the present invention. Recall that a whole array operation accesses all elements of a specified array or sub-array. The system first retrieves start address 302 from FIG. 3 (step 502). Next, the system retrieves extent values (or upper bound values) from consecutive memory locations in group of extent values 304 (step 504). Next, the system retrieves stride values from consecutive memory locations in group of stride values 306 (step 506). The system uses the start address 302, the group of extent values 304 and the group of stride values 306 to march a pointer through the specified array (or sub-array) in order to perform the whole array operation (step 508).

Note that the above-described whole array operation accesses consecutive memory locations from array descriptor 300, thereby exhibiting good cache performance.

Table 1 presents an example in the C programming language of a whole array operation. Note in this example that the code first accesses the actual origin (start address) 302, then proceeds through the extents and finally the strides in consecutive order. Also note that the loops start from the beginning of the array and move in a downward direction, which speeds up the test for the loop termination condition.

If multiple arrays are involved in the whole array operation, the accesses for the multiple arrays can be performed within the same loops by maintaining pointers into each of the multiple arrays.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

TABLE 1

```
/* Copyright © 1998 SUN Microsystems, Inc. All Rights Reserved. */
address[n] = actual-origin;
for(i[n] = extent[n]; i[n] >0 0; --i[n])
{
    address[n-1] = address[n];
    for(i[n-1] = extent[n-1]; i[n-1] > 0; --i[1]);
    {
        address[n-2] = address[n-1];
        ...
        address[1] = address[2];
        for(i[1] = extent[1]; i[1] > 0; --i[1])
        {
            operation(address [1]);
            address[1] += stride[1];
        }
        ...
        address[n-1] += stride[n-1];
    }
    address[n] += stride[n];
}
```

What is claimed is:

1. A computer readable memory including an array descriptor data structure containing information on an organization of an array of data values, the array descriptor data structure facilitating accesses into the array of data values, the array descriptor data structure comprising:

a start address, including a starting address of the array in the memory;

a group of extents, including an extent value for each dimension of the array, the extent value for a given dimension quantifying a number of elements in the given dimension, wherein the group of extents are stored in consecutive locations so that they can be accessed by a computer without accessing intervening values;

a group of strides, including a stride value for each dimension of the array, the stride value of a given dimension quantifying a distance in array elements between consecutive array locations in the given dimension, wherein the group of strides are stored in consecutive locations so that they can be accessed by the computer without accessing intervening values; and a group of lower bound addresses, including a lower bound address for each dimension of the array, wherein the group of lower bound addresses are stored in consecutive locations so that they can be accessed by the computer without accessing intervening values.

2. The computer readable memory including an array descriptor data structure of claim 1, wherein the group of strides is located in consecutive memory locations, so that an access to an array element through subscripts retrieves strides from consecutive memory locations, thereby exhibiting good cache performance.

3. The computer readable memory including an array descriptor data structure of claim 2, further comprising a virtual origin address of a virtual array element, possibly outside the array, that has a zero index value for each dimension in the array.

4. The computer readable memory including an array descriptor data structure of claim 3, wherein the virtual origin address is adjacent to the group of strides in the memory, thereby allowing the access to the array element through subscripts to retrieve the virtual origin address from an adjacent location in the memory.

5. The computer readable memory including an array descriptor data structure of claim 1, wherein the group of extents are located in consecutive memory locations, and the group of strides is located in consecutive memory locations, so that a whole array operation, which accesses all locations in the array, first retrieves extents from consecutive memory locations, and then retrieves strides from consecutive memory locations so as to exhibit good cache performance.

6. The computer readable memory including an array descriptor data structure of claim 5, wherein the start address is adjacent to the group of extents in memory, thereby allowing the whole array operation to retrieve the start address from an adjacent location in the memory.

7. The computer readable memory including an array descriptor data structure of claim 1, wherein the array descriptor is defined in a programming language that provides for variable-sized dynamically allocated arrays.

8. The computer readable memory including an array descriptor data structure of claim 1, wherein the array descriptor is defined within the FORTRAN programming language.

9. A computer readable memory including an array descriptor data structure containing information on an organization of an array of data values, the array descriptor data structure facilitating accesses into the array of data values, the array descriptor data structure comprising:

a start address, including a starting address of the array in the memory;

a group of extents, including an extent value for each dimension of the array, the extent value for a given dimension quantifying a number of elements in the given dimension, wherein the group of extents are located in consecutive memory locations, wherein the start address is adjacent to the group of extents in memory, and wherein the group of extents are stored in consecutive locations so that they can be accessed by a computer without accessing intervening values;

a group of strides, including a stride value for each dimension of the array, the stride value of a given dimension quantifying a distance in array elements between consecutive array locations in the given dimension, wherein the group of strides is located in consecutive memory locations, and wherein the group of strides are stored in consecutive locations so that they can be accessed by the computer without accessing intervening values;

a virtual origin address of a virtual array element, possibly outside the array, that has a zero index value for each dimension in the array, wherein the virtual origin address is adjacent to the group of strides in the memory; and a group of lower bound addresses, including a lower bound address for each dimension of the array, wherein the group of lower bound addresses are stored in consecutive locations so that they can be accessed by the computer without accessing intervening values.

10. A method for accessing an array element from an array using subscripts, comprising:

computing the address of the array element by,
retrieving stride values associated with dimensions in the array, a given stride value quantifying a distance in array elements between consecutive array locations in a given dimension, wherein the stride values are retrieved from consecutive memory locations so as to exhibit good cache performance,
multiplying the stride values by corresponding array index values to produce multiplied stride values,
summing the multiplied stride values with a virtual origin address to produce the address for the array element, the virtual origin address including an address of a virtual array element, possibly outside of the array, that has a zero index value for each dimension in the array; and
using the address of the array element to access the array element.

11. The method of claim 10, further comprising retrieving the virtual origin address from a memory location adjacent to the stride values.

12. The method of claim 10, further comprising computing the virtual origin address from a starting address of the array in the memory.

13. The method of claim 10, wherein the array is defined within the FORTRAN programming language.

14. A method for performing a whole array operation, which accesses all locations in an array of data values, comprising:

retrieving extent values associated with dimensions in the array, a given extent value quantifying a number of elements in the given dimension, wherein the extent values are retrieved from consecutive memory locations so as to exhibit good cache performance;

retrieving stride values associated with dimensions in the array, a stride value of a given dimension quantifying a distance in array elements between consecutive array locations in the given dimension, wherein the stride values are retrieved from consecutive memory locations so as to exhibit good cache performance; and using the extent values and the stride values to scan through all of the array elements in order to perform the whole array operation.

15. The method of claim 14, further comprising retrieving a start address from a memory location adjacent to the extent values, the start address comprising a starting address of the array in the memory.

16. The method of claim 14, wherein the array is defined within the FORTRAN programming language.

17. A method for constructing an array descriptor data structure containing information on an organization of an array of data values, comprising:

including a start address in the array descriptor, the start address including a starting address of the array in a memory;

including a group of extents in the array descriptor, the group of extents including an extent value for each dimension of the array, the extent value for a given dimension quantifying a number of elements in the given dimension, wherein the group of extents are stored in consecutive locations so that they can be accessed by a computer without accessing intervening values;

including a group of strides in the array descriptor, the group of strides including a stride value for each dimension of the array, the stride value of a given dimension quantifying a distance in array elements between consecutive array locations in the given dimension, the group of strides being located in consecutive memory locations, wherein the group of strides are stored in consecutive locations so that they can be accessed by the computer without accessing intervening values; and including a group of lower bound addresses in the array descriptor, the group of lower bound addresses including a lower bound address for each dimension of the array, wherein the group of lower bound addresses are stored in consecutive locations so that they can be accessed by the computer without accessing intervening values.

18. The method of claim 17, further comprising including a virtual origin address in the array descriptor, the virtual origin address including an address of a virtual array element, possibly outside the array, that has a zero index value for each dimension in the array.

19. The method of claim 17, wherein the group of extents is located in consecutive memory locations.

20. The method of claim 17, wherein the array is defined within the FORTRAN programming language.

21. A computer readable storage medium storing instructions that when executed by a computer cause the computer to perform a method for accessing an array element from an array using subscripts, the method comprising:

computing the address of the array element by,
retrieving stride values associated with dimensions in the array, a given stride value quantifying a distance in array elements between consecutive array locations in a given dimension, wherein the stride values are retrieved from consecutive memory locations so as to exhibit good cache performance,
multiplying the stride values by corresponding array index values to produce multiplied stride values,
summing the multiplied stride values with a virtual origin address to produce the address for the array element, the virtual origin address including an address of a virtual array element, possibly outside of the array, that has a zero index value for each dimension in the array; and using the address of the array element to access the array element.

22. A computer readable storage medium storing instructions that when executed by a computer cause the computer to perform a method for constructing an array descriptor data structure containing information on an organization of an array of data values, the method comprising:

including a start address in the array descriptor, the start address including a starting address of the array in the memory;

including a group of extents in the array descriptor, the group of extents including an extent value for each dimension of the array, the extent value for a given dimension quantifying a number of elements in the given dimension, wherein the group of extents are stored in consecutive locations so that they can be accessed by a computer without accessing intervening values;

including a group of strides in the array descriptor, the group of strides including a stride value for each dimension of the array, the stride value of a given dimension quantifying a distance in array elements between consecutive array locations in the given dimension, the group of strides being located in consecutive memory locations, wherein the group of strides are stored in consecutive locations so that they can be accessed by the computer without accessing intervening values; and including a group of lower bound addresses in the array descriptor, the group of lower bound addresses including a lower bound address for each dimension of the array, wherein the group of lower bound addresses are stored in consecutive locations so that they can be accessed by the computer without accessing intervening values.

* * * * *